United States Patent [19]
Bishop et al.

[11] Patent Number: 5,456,984
[45] Date of Patent: Oct. 10, 1995

[54] HALOGEN-FREE RADIATION CURABLE FLAME RETARDANT COMPOSITIONS

[75] Inventors: Timothy E. Bishop, Algonquin; Erwin S. Poklacki, Arlington Heights, both of Ill.

[73] Assignee: DSM Desotech, Inc., Elgin, Ill.

[21] Appl. No.: 381,281

[22] Filed: Feb. 6, 1995

Related U.S. Application Data

[63] Continuation of Ser. No. 212,265, Mar. 14, 1994, abandoned, which is a continuation-in-part of Ser. No. 89,173, Jul. 8, 1993, abandoned.

[51] Int. Cl.$^6$ .......................... B32B 17/04; C08G 18/32
[52] U.S. Cl. .......................... 428/373; 428/374; 522/90; 522/96; 522/97; 522/171
[58] Field of Search .......................... 428/373, 374; 522/90, 96, 97, 171

[56] References Cited

U.S. PATENT DOCUMENTS

| | | | |
|---|---|---|---|
| 364,910 | 1/1975 | Kuehn | 260/859 |
| 3,953,393 | 4/1976 | Ramlow et al. | 260/31.8 R |
| 4,269,727 | 5/1981 | Atchison et al. | 522/171 |
| 4,591,522 | 5/1986 | Kang et al. | 428/419 |
| 4,657,968 | 4/1987 | Goel | 525/28 |
| 4,883,892 | 11/1989 | Hardy et al. | 558/164 |
| 4,886,895 | 12/1989 | Hardy et al. | 558/161 |
| 5,136,679 | 8/1992 | Broer et al. | 385/128 |
| 5,175,228 | 12/1992 | Wang et al. | 528/48 |
| 5,206,926 | 4/1993 | Yamamoto et al. | 385/143 |

FOREIGN PATENT DOCUMENTS 59-149917  8/1984  Japan.

OTHER PUBLICATIONS

Hitachi Chemical Company, "Fire–Resistant Photosensitive Resin Compositions", *Chemical Abstracts*, vol. 102, No. 2, Abstract No. 7701n, pp. 45, Col. 2 (Jan. 1985).

Smit et al., "Radiation Cured Halogen Free Flame Retardant Coating", *TNO Centre for Polymeric Materials/TNO Fibre Research Institute*, pp. 148–153.

Wenjeng Guo, "Flame–Retardant Modification of UV–Curable Resins with Monomers Containing Bromine and Phosphorus", *Journal of Polymer Science: Part A: Polymer Chemistry*, 30:819–827, 1992.

*Primary Examiner*—Susan W. Berman
*Attorney, Agent, or Firm*—Dressler, Goldsmith, Shore & Milnamow, Ltd.

[57] ABSTRACT

A halogen-free radiation curable flame retardant composition that comprises an end-capped oligomer of a phosphonate polyol and a polyisocyanate and an organic monomer.

17 Claims, No Drawings

HALOGEN-FREE RADIATION CURABLE FLAME RETARDANT COMPOSITIONS

This is a continuation application of U.S. Ser. No. 08/212,265, filed Mar. 14, 1994, now abandoned, which is a continuation-in-part application of U.S. Pat. No. 08/089,173, filed Jul. 8, 1993, now abandoned.

TECHNICAL FIELD OF THE INVENTION

This invention relates to halogen-free radiation curable polyurethane resin compositions containing phosphonate esters. This invention also relates to halogen-free flame retardant polyurethane compositions.

BACKGROUND OF THE INVENTION

Radiation curable polyurethane resins are widely used in radiation curable coating compositions for various substrates. Because polyurethane resins are generally flammable, flame retardants must be incorporated in the resins for many applications. However, traditional flame retardants typically contain halogens or require halogens in their manufacture. For example, flame retardant modified ultraviolet curable urethane acrylate resins with monomers containing bromine and phosphorus have been reported by W. Guo in the *Journal of Polymer Science*, Part A: Polymer Chemistry, Vol. 30, pp. 819–827 (1992).

To avoid the toxic and corrosive combustion products associated with the use of halogens, research efforts are presently directed toward developing radiation curable, halogen-free flame retardant coatings. It has been reported that a phosphonate compound having a polymerizable vinyl group can be attached by radiation curing to an acrylated, aliphatic polyester urethane. While the compound is an improvement over the halogen-containing flame retardants, the manufacture of the compound requires an acyl halide to form the vinyl group and produces hydrogen chloride as a manufacturing by-product. Both of these halide compounds present handling and disposal problems.

A need exists for a radiation curable composition that contains no halogens, is manufactured without halide compounds and produces a halogen-free, flame retardant polyurethane resin polymer. Preferably, the radiation curable composition would produce a flame retardant polymer which resists leaching by organic chemicals such as acetone and exhibits relatively low thermal weight loss. It would also be desirable to produce a flame retardant polymer that is optically clear, which excludes the use of inorganic fillers such as hydrated alumina, magnesium hydroxide or antimony oxide.

One application for such a composition is the matrix material in optical fiber plenum cables. The flammability requirements for plenum cables are very stringent and difficult to meet without a flameoretardant matrix material. A matrix is a composition that covers or coats a group of optical fibers. Typically, the group consists of about 4 to about 8 optical fibers; however, the group may consist of more than 8 or less than 4 optical fibers. The matrix is used to help bond the optical fibers together and protect the fibers from environmental stress even though the optical fibers may already be individually coated with various coatings. A clear, non-halogenated, radiation curable matrix material provides for easy visibility of the optical fibers, low corrosivity of combustion products, and fast line speeds.

SUMMARY OF THE INVENTION

This invention relates to a radiation curable composition essentially without halogens that is suitable for producing flame retardant polymers. The composition comprises an end-capped oligomer of a phosphonate polyol and a polyisocyanate, a monomer susceptible to free radical copolymerization, and, optionally, a photoinitiator.

In one embodiment, the invention is a radiation curable composition that comprises an oligomer of a polyisocyanate and a phosphonate polyol, the oligomer being end-capped by at least one monohydroxy acrylate, and an organic monomer capable of participating in a free radical copolymerization with the end-capped oligomer. The composition may also contain a photoinitiator that is sensitive to ultraviolet electromagnetic radiation. Generally, the polyol is of the formula:

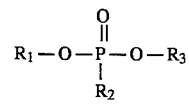

wherein $R_1$ and $R_3$ are independently $C_1$ to $C_{18}$ alkyl or aryl; and $R_2$ is polyhydroxyalkyl, polyhydroxyaryl, polyhydroxyalkylaminoalkyl, polyhydroxyarylaminoalkyl, polyhydroxyalkylaminoaryl or polyhydroxyarylaminoaryl having from 1 to 18 carbon atoms inclusive.

In another embodiment, the invention is a radiation curable composition essentially free of halogens that comprises an oligomer which is the reaction product of a polyisocyanate and a phosphonate polyol, said oligomer being capped by at least one monohydroxy functional compound with ethylenic unsaturation, and said polyol having the formula:

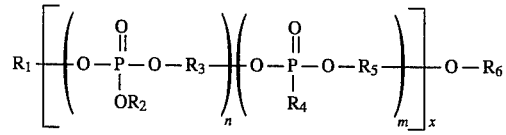

wherein $R_1$, $R_2$, $R_4$ and $R_6$ are each independently selected from the group consisting of alkyl, aryl, poly (alkylene oxide) polyhydroxyalkyl, polyhydroxyaryl, polyhydroxyalkylaminoalkyl, polyhydroxyarylaminoalkyl, polyhydroxyalkylaminoaryl and polyhydroxyarylaminoaryl; $R_3$ and $R_5$ are each independently selected from the group consisting of alkylene and arylene; m and n are each independently an integer from 0 to 10 inclusive, provided that at least one of m and n is 1 or more; and x is 1 to 100.

The composition also comprises an essentially halogen-free organic monomer. The composition may also contain a photoinitiator that is sensitive to ultraviolet electromagnetic radiation.

DETAILED DESCRIPTION OF THE INVENTION

This invention provides a radiation curable composition suitable for use in producing a flame retardant polymer. The composition comprises an end-capped oligomer of a phosphonate polyol and a polyisocyanate. As used herein the term "polyisocyanate" shall mean a molecule having one or more isocyanate functional groups. The composition also contains a halogen-free organic monomer and, optionally, a photoinitiator.

In one aspect, the invention is a composition which comprises an oligomer of a phosphonate polyol and a polyisocyanate. Preferably, the polyol is a diol and the isocyanate is a diisocyanate. Preferred polyols have the formula:

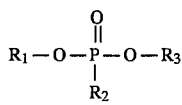

wherein $R_1$ and $R_3$ are each independently $C_1$ to $C_{18}$ alkyl or aryl; and $R_2$ is polyhydroxyalkyl, polyhydroxyaryl, polyhydroxyalkylaminoalkyl, polyhydroxyarylaminoalkyl, polyhydroxyalkylaminoaryl or polyhydroxyarylaminoaryl having from 1 to 18 carbon atoms inclusive.

As used herein, the term "alkyl" refers to a straight or branched group of 1 to 18 carbon atoms inclusive including, but not limited to, methyl, ethyl, n-propyl, isopropyl, n-butyl, sec-butyl, isobutyl, tert-butyl and the like.

As used herein, the term "aryl" includes aromatic rings that are fused, unfused or linked that can contain up to 18 carbon atoms and can include one or more heteroatoms, as for example, phenyl, naphthyl, anthracenyl, biphenyl, quinolyl and the like. The aromatic rings can be unsubstituted or substituted with alkyl groups.

As used herein, the term "poly (alkylene oxide)" means a series of alternating alkyl groups and oxygen atoms. Examples of poly (alkylene oxides) include, but are not limited to polyethylene oxide, polypropylene oxide, and polybutylene oxide.

As used herein, the term "polyhydroxyalkyl" means an alkyl group having one or more hydroxyl (—OH) functional groups.

As used herein, the term "polyhydroxyaryl" means an aryl group having one or more hydroxyl functional groups.

As used herein, the term "polyhydroxyalkylaminoalkyl" means an alkyl group that is attached to an amino group, and the amino group is substituted with at least one alkyl group having one or more hydroxyl functional groups.

As used herein, the term "polyhydroxyarylaminoalkyl" means an aryl group that is attached to an amino group, and the amino group is substituted with at least one alkyl group having one or more hydroxyl functional groups.

As used herein, the term "polyhydroxyalkylaminoaryl" means an alkyl group that is attached to an amino group, and the amino group is substituted with at least one aryl group having one or more hydroxyl functional groups.

As used herein, the term "polyhydroxyarylaminoaryl" means an aryl group that is attached to an amino group, and the amino group is substituted with at least one aryl group having one or more hydroxyl functional groups.

An example of a preferred polyol is diethyl-N,N-bis(2-hydroxyethyl)aminomethyl phosphonate, which is commercially available from Akzo Chemicals, Inc. of Chicago, Ill. under the trade name FYROL℧6. Phosphonate polyols are preferred over phosphate polyols since the former are believed to be relatively more resistant to hydrolysis than are phosphate polyols.

The reaction of polyisocyanates with polyols to produce oligomers containing the urethane group is well known and need not be described in detail here. Preferably, the polyisocyanate is a diisocyanate. Suitable diisocyanates include, but are not limited to, toluene diisocyanate, isophorone diisocyanate, trimethylhexane diisocyanate, dicyclohexylmethane diisocyanate, diphenylmethanediisocyanate, hexamethylene diisocyanate, naphthalene diisocyanate, phenylene diisocyanate and diphenyldiisocyanate. Trimethylhexane diisocyanate is most preferred.

The oligomer can be end-capped in many ways. For example, an end-capped oligomer may be made by pre-reacting a diisocyanate with a capping agent to form a monoisocyanate, which is later reacted with a polyol. Alternatively, a polyol, polyisocyanate and capping agent may be reacted together at once, or a polyol and polyisocyanate may be reacted first and the oligomer end-capped subsequently. The reaction of the capping agent with a polyisocyanate produces a stable reaction product which persists in the oligomer until stimulated by the presence of free radicals. Preferably, the capping agent is a monohydroxy acrylate, such as hydroxymethyl acrylate, hydroxyethyl acrylate, hydroxypropyl acrylate or hydroxybutyl acrylate. A preferred monohydroxy functional acrylate is 2-hydroxyethyl acrylate. Other monohydroxy, ethylenically unsaturated capping agents can also be employed. These include the corresponding methacrylate, vinyl ether, allyl ether, vinyl ester, itaconate, crotonate compounds and the like.

If the amounts of the polyol and the polyisocyanate are relatively close to a stoichiometric balance when the oligomer is synthesized, the oligomer produced tends to have a greater molecular weight. Similarly, polyols of greater molecular weight generally react to produce oligomers of greater molecular weight. These two factors are preferably controlled to provide an end-capped oligomer having a number average molecular weight in the range of about 1,000 to about 3,000.

The oligomer is admixed with an organic monomer. Monomers of higher polarity are more soluble with the polyphosphonate urethane acrylate (i.e., the end-capped oligomer) than are monomers of lower polarity. The monomer contains a functional group that can undergo free radical polymerization, preferably an acrylic or vinylic group. Preferred organic monomers include, but are not limited to, tetrahydrofurfuryl acrylate, ethoxyethoxyethyl acrylate, diethyleneglycol diacrylate, trimethylolpropane ethoxylate triacrylate, methoxyethyl acrylate and hydroxy functional caprolactone acrylate. Preferably, the monomer contains essentially no halogens.

If the composition is to be cured by ultraviolet radiation, a photoinitiator is added to the mixture of the oligomer and organic monomer to induce a free radical reaction involving the oligomers and the monomers on exposure to ultraviolet light. While many such photoinitiators are well known, it is preferred that the photoinitiator contain essentially no halogens. Several suitable photoinitiators are specified in U.S. Pat. No. 4,591,522 to Kang et al., which is hereby incorporated by reference. An example of a preferred photoinitiator is 1-hydroxycyclohexylphenylketone. Also preferred is a blend of equal amounts of 2-hydroxy-2-methyl-1-phenylpropane-1-one and 2,4,6-trimethylbenzoyldiphenylphosphine oxide. The composition may also be cured by various other methods known to those skilled in the art. For, example, curing may be accomplished by exposure of the composition to an electron beam or by thermal means. The composition can, optionally, contain additional components such as stabilizers, plasticizers, adhesion promoters and chain transfer agents.

In another embodiment of the invention, the preferred phosphonate polyol is a water soluble hydroxyl-containing oligomeric phosphonate commercially available from Akzo Chemicals, Inc. of Chicago, Ill. under the trade name FYROL™51. This material is prepared from dimethyl methylphosphonate, phosphorous pentoxide, and ethylene oxide. For example, a water soluble hydroxyl-containing oligomeric phosphonate polyol may be made from the reaction product of dimethyl methylphosphonate, phosphorous pentoxide, ethylene oxide and water in a molar ratio of 2:2:8:1, respectively. In general, polyols made from these compounds may have alternating, random or block structures, with the primary components being phosphate and phosphonate groups. The polyol is believed to have the general formula:

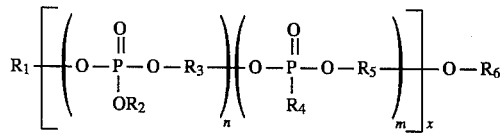

wherein $R_1$, $R_2$, $R_4$ and $R_6$ are each independently selected from the group consisting of alkyl, aryl, poly (alkylene oxide) polyhydroxyalkyl, polyhydroxyaryl, polyhydroxyalkylaminoalkyl, polyhydroxyarylaminoalkyl, polyhydroxyalkylaminoaryl and polyhydroxyarylaminoaryl; $R_3$ and $R_5$ are each independently selected from the group consisting of alkylene and arylene; m and n are each independently an integer from 0 to 10 inclusive, provided that at least one of m and n is 1 or more; and x is 1 to 100.

The composition also comprises an essentially halogen-free organic monomer that is polymerizable by a free radical mechanism. The monomer is, for example, diethyleneglycol diacrylate, tripropylene glycol diacrylate, hexanediol diacrylate, tetrahydrofurfuryl acrylate, methoxyethyl acrylate, ethoxyethoxyethyl acrylate or trimethyloylpropane triacrylate. The composition can also optionally contain a photoinitiator, as described above. Stabilizers, plasticizers, adhesion promoters, and chain transfer agents may also be present in the solution.

The halogen-free radiation curable flame retardant compositions of the present invention may be applied to a substrate and cured. As used herein, a substrate shall mean any substance, material, device, etc., on which it is desired to apply a curable composition. The composition may be applied to the surface of the substrate or the composition may be introduced into a substrate, as is the case when the substrate is porous or fibrous or when the substrate has a region in which the composition may be contained. A substrate could, for example, be an electrical circuit board, an optical fiber or a group of optical fibers, or a fibrous material that is part of a composite to be formed. Typically, the composition is applied to a substrate and then the composition is cured. It is contemplated that a substrate may be coated with more than one composition. When a substrate has more than one coating, the coatings may be the same or different, and the coating compositions may be applied sequentially and then all cured at once, or each composition may be applied and cured before the next composition is applied.

The following examples are presented to better communicate the invention. The examples are not intended to limit the scope of the invention in any way.

EXAMPLES

Example 1

An oligomer was prepared by reacting 302.53 g FYROL™51 with the reaction product of 108.90 g of trimethylhexane diisocyanate and 59.79 g of 2-hydroxyethylacrylate. 0.12 g of phenothiazine, as an inhibitor, and 0.20 g. dibutyltin dilaurate, a catalyst, are also present. The reaction is carried out between 30° and 80° C. in the presence of an atmosphere of dry air.

The resulting oligomer was clear and colorless with a viscosity of 305,000 millipascal-seconds, and had a refractive index of 1.477.

Example 2

A sample weighing 76.0 g of the oligomer prepared in Example 1 and 20.0 g of hexanediol diacrylate were blended to form a solution. To the solution was added 3.0 g of 1-hydroxycyclohexyl phenylketone, 0.5 g of bis(1-octoxy-2,2,6,6-tetramethyl-4-piperidinyl)sebacate, and 0.5 g of thiodiethylene bis(3,5-di-t-butyl-4-hydroxy)hydrocinnamate. The sebacate and the hydrocinnamate acted as stabilizers. The solution exhibited a viscosity of 7690 millipascal-seconds. The solution was subsequently irradiated with ultraviolet light to produce a polymer.

The polymer appeared clear with a straw color and was flexible. The polymer proved to be immediately self-extinguishing in horizontal and vertical flammability tests. In each of the tests, a film of the polymer having a thickness of 250 microns was exposed to an open flame for five seconds. Only minimal smoke was observed.

Example 3

An oligomer was prepared by reacting a mixture of 203.12 g FYROL™51 and 22.56 g of trimethylol propane with the reaction product of 96.52 g of 2-hydroxyethyl acrylate and 175.97 g of trimethylhexane diisocyanate. The reactions were carried out between 25° and 90° C. in the presence of dry air, 0.13 g of phenothiazine, as an inhibitor, and 0.26 g of dibutyltindilaurate, the catalyst. The resulting oligomer was clear and exhibited a viscosity of greater than 1 million millipascal-seconds.

Example 4

A sample weighing 70.0 g of the oligomer prepared in Example 3 was blended with 26.0 g of tetrahydrofurfuryl acrylate to produce a solution. To the solution was added 3.0 g of 1-hydroxycyclohexylphenyl ketone and 0.5 each, of the sebacate stabilizer and the hydrocinnamate stabilizer described in Example 2. The solution exhibited a viscosity of 4370 millipascal-seconds. The solution was subsequently cured by ultraviolet irradiation to produce a polymer. The polymer proved to be immediately self-extinguishing in horizontal and vertical flammability tests. Only minimal smoke was observed during testing. The polymer had a clear, straw appearance and was flexible.

Example 5

An oligomer was prepared by first reacting 92.56 g of 2-hydroxyethyl acrylate with 208.22 g of toluene diisocyanate in the presence of 0.15 g of phenothiazine as an inhibitor, at 25° to 40° C. in an atmosphere of dry air. To this mixture was added 197.21 g of FYROLT™6 and 214.42 g of tripropylene glycol diacrylate, which served as a reactive diluent. The mixture was heated to 90° C. with stirring to complete the reaction. The resulting oligomer was clear and amber in color, and had a viscosity greater than 1 million millipascal-seconds.

Example 6

A sample weighing 68.0 g of the oligomer prepared in Example 5, was blended with 28.0 g of diethyleneglycol diacrylate to produce a solution. To the solution was added 3.0 g of 1-hydroxycyclohexylphenyl ketone, 0.5 g of bis(1, 2,2,6,6-pentamethyl-4-piperidinyl)sebacate and 0.5 g of triethylene glycolbis[3-(3'-tert-butyl-4'hydroxy-5'-methylphenyl) propionate]. The solution exhibited a viscosity of 7200 millipascal-seconds.

Thereafter, the solution was cured by ultraviolet radiation to produce a polymer. The polymer was amber in color and clear. Analyses indicated that the polymer quickly self-extinguished during horizontal and vertical flammability tests. A film of the polymer was observed to be relatively hard and brittle.

Example 7

The procedure of Example 6 was performed again, except that 3.0 g of a blended photoinitiator was utilized in place of the 1-hydroxycyclohexylphenyl ketone. The blended photoinitiator contained equal parts of 2-hydroxy-2-methyl-1-phenylpropane-1one and 2,4,6-(trimethylbenzoyldiphenylphosphine) oxide. The solution exhibited a viscosity of 7400 millipascal-seconds. Ultraviolet irradiation produced a clear polymer of amber color. A film of the polymer was relatively hard and brittle. The polymer self-extinguished quickly in horizontal and vertical flammability tests.

Example 8

A sample weighing 58.0 g of the oligomer prepared in Example 1 was blended with 30.0 g of trimethylol propane ethoxylated triacrylate and 8.0 grams of diethylene glycol diacrylate to produce a solution. To the solution was added 3.0 g of 1-hydroxycyclohexyl phenyl ketone as a photoinitiator. Additionally, 0.5 g each of the stabilizers bis( 1,2,2, 6,6-pentamethyl-4-piperidinyl)sebacate and triethylene glycol bis[3-(3'-tert-butyl-4'-hydroxy-5'-methylphenyl) propionate] were blended into the solution. The solution exhibited a viscosity of 3240 millipascal-seconds and a density of 1.199 grams per cubic centimeter. Thereafter, the solution was cured by ultraviolet radiation from a Fusion Systems "D"-lamp at a dose of 1.0 joule per square centimeter to produce a polymer.

The cured polymer exhibited a clear appearance and a light straw color. It was determined that the polymer had a tensile strength of 9.9 megapascals, an elongation of 14 percent and a modulus of 130 megapascals. Both horizontal and vertical flammability tests demonstrated that the polymer was self-extinguishing and produced minimal smoke. The polymer was rated as 94 HB using Underwriter's Laboratory test method for horizontal flammability UL-94 and as V-O using vertical flammability test UL-94.

Preferred aspects of the invention have been described to better communicate the invention. However, the scope of the invention is intended to be as broad as the appended claims will allow.

Examples 1, 3 and 5 demonstrate that radiation curable oligomers that are essentially free of halogens can be prepared by oligomerizing and end-capping a blend of a phosphonate polyol and a diisocyanate. Examples 2, 4, 6, 7 and 8 prove that a relatively flame retardant halogen-free polymer can be prepared by radiation curing of the composition within the scope of the present claims.

We claim:

1. A essentially halogen-free UV radiation or electron beam curable composition suitable for producing a flame retardant polymer, which comprises:

an oligomer which is the reaction product of a polyisocyanate and phosphonate polyol, said oligomer being end-capped by at least one monohydroxy functional compound with ethylenic unsaturation; and an organic monomer; said polyol being having the formula:

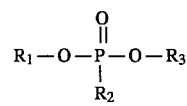

wherein $R_1$ and $R_3$ are independently $C_1$ to $C_{18}$ alkyl or aryl; and $R_2$ is polyhydroxyalkyl, polyhydroxyaryl, polyhydroxyalkylaminoakyl, polyhydroxylarylaminoalkyl, polyhydroxalkylaminoaryl or polyhydroxyarylaminoaryl having from 1 to 18 carbon atoms inclusive.

2. The composition of claim 1 wherein said polyisocyanate is selected from the group consisting of toluene diisocyanate, trimethylhexane diisocyanate, dicyclohexylmethane diisocyanate, isophoronediisocyanate, diphenylmethane diisocyanate, hexamethylene diisocyanate, phenylene diisocyanate, and biphenyl diisocyanate.

3. The composition of claim 1 wherein $R_1$ and $R_3$ are ethyl.

4. The composition of claim 1 wherein $R_2$ is N,N-bis(2-hydroxyethyl)aminomethyl.

5. The composition of claim 1 wherein said organic monomer is selected from the group consisting of tetrahydrofurfuryl acrylate, ethoxyethoxyethyl acrylate, diethyleneglycol diacrylate, trimethylolpropane ethoxylate triacrylate, methoxyethyl acrylate and hydroxy caprolactone acrylate.

6. The composition of claim 1 wherein said monohydroxy compound with ethylenic unsaturation is 2-hydroxyethyl acrylate.

7. A essentially halogen-free UV radiation or electron beam curable composition suitable for producing a flame retardant polymer, which comprises:

an oligomer which is the reaction product of a polyisocyanate and a phosphonate polyol, said oligomer being capped by at least one monohydroxy functional compound with ethylenic unsaturation; and an organic monomer; said polyol being the reaction product of dimethyl methylphosphonate, phosphorus pentoxide, ethylene oxide and water in a molar ration of about 2:2:8:1, respectively.

8. A substrate that is coated with the composition of claim 1, which is cured.

9. A group of optical fibers having a matrix made from the cured composition of claim 1.

10. A essentially halogen-free UV radiation or electron beam curable composition suitable for producing a flame retardant polymer, which comprises:

an oligomer that is the reaction product of a polyisocyanate and a phosphonate polyol, said oligomer being capped by at least one monohydroxy functional compound with ethylenic unsaturation; and an organic monomer; said polyol having the formula:

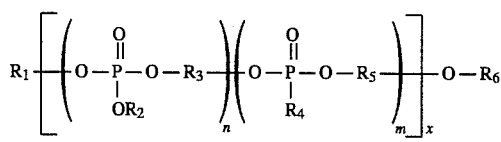

wherein $R_1$, $R_2$, $R_4$ and $R_6$ are each independently selected from the group consisting of alkyl, aryl, poly (alkylene oxide) polyhydroxyalkyl, polyhydroxaryl, polyhydroxyalkylaminoalkyl, polyhydroxyarylaminoalkyl, polyhydroxyalkylaminoaryl and polyhydroxyarylaminoaryl; $R_3$ and $R_5$ are each independently selected from the group consisting of alkylene and arylene; m and n are each independently an integer from 0 to 10 inclusive, provided that at least one of m and n is 1 or more; and x is 1 to 100.

11. The composition of claim 10 wherein said monohydroxy compound with ethylenic unsaturation is 2-hydroxyethylacrylate.

12. The composition of claim 10 wherein $R_3$ and $R_5$ are ethylene.

13. The composition of claim 10 wherein $R_4$ is methyl.

14. The composition of claim 10 wherein said polyisocyanate is selected from the group consisting of toluene diisocyanate, trimethylhexanediisocyanate, dicyclohexyl methane diisocyanate, isophorone diisocyanate, diphenylmethane diisocyanate, hexamethylene diisocyanate, phenylene diisocyanate and biphenyl diisocyanate.

15. The composition of claim 10 wherein said organic monomer is selected from the group consisting of diethyleneglycol diacrylate, tripropyleneglycoldiacrylate, hexanediol diacrylate, tetrahydrofurfurylacrylate and trimethylolpropane ethoxylate triacrylate.

16. A substrate that is coated with the cured composition of claim 10, which is cured.

17. A group of optical fibers having a matrix made from the cured composition of claim 10.

* * * * *